Oct. 8, 1957     H. L. KELLOGG ET AL     2,809,348
DEVICE FOR TESTING WIRE INSULATION
Filed Dec. 24, 1956
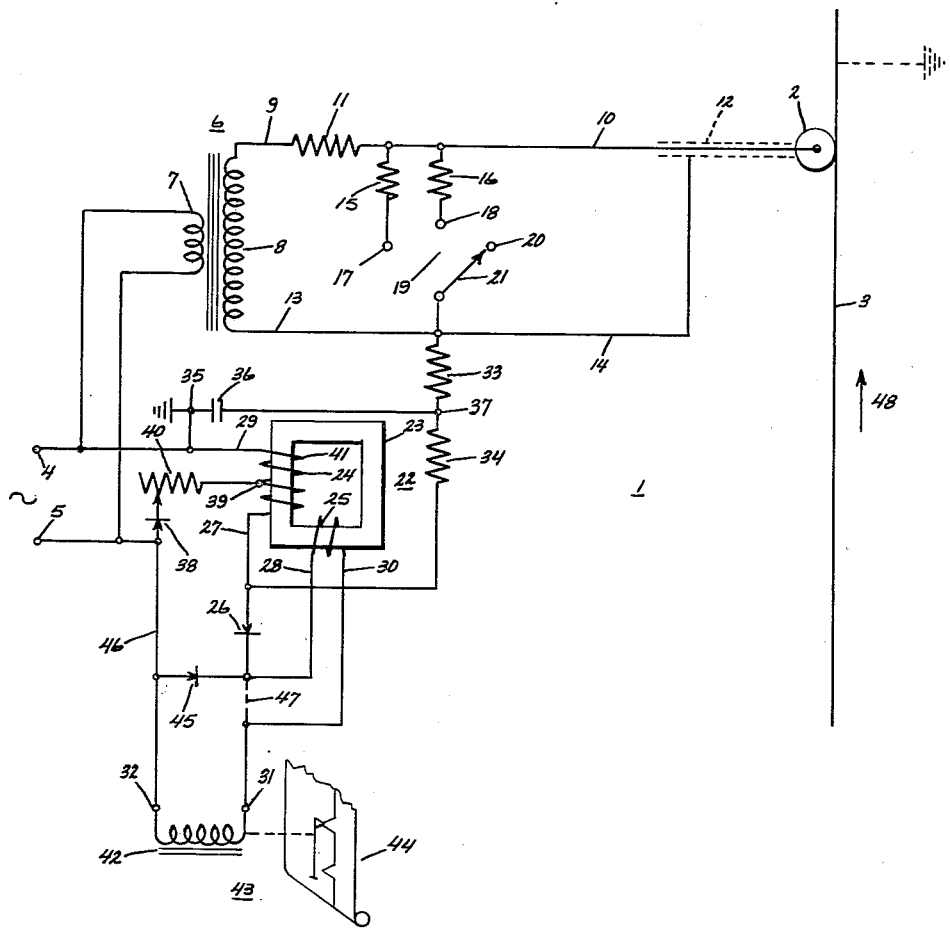
Inventors:
Harry L. Kellogg,
William H. Abbott,
by Robert G. Irish
Their Attorney.

United States Patent Office 2,809,348
Patented Oct. 8, 1957

2,809,348

DEVICE FOR TESTING WIRE INSULATION

Harry L. Kellogg and William H. Abbott, Fort Wayne, Ind., assignors to General Electric Company, a corporation of New York Application December 24, 1956, Serial No. 630,401

8 Claims. (Cl. 324—54)

This invention relates to devices for testing wire insulation to detect breaks therein and more particularly to devices for continuously testing the continuity of insulation on wire.

Wire having insulation formed of one or more coats of enamel is used in large quantity in the manufacture of electrical apparatus such as dynamoelectric machines and transformers; such wire is conventionally referred to as magnet wire. It is difficult to manufacture magnet wire in quantity which does not have any breaks in the enamel coating, however, a predetermined number of breaks in the insulation for any given length of wire can be tolerated since when such wire is wound in coils, it is highly unlikely that the breaks in the insulation will occur adjacent each other thereby causing a short circuit. Magnet wire manufacturers therefore may guarantee to their customers that particular lots of magnet wire have no more than a certain predetermined number of breaks per given unit of length, generally 100 feet; this requires that there be available apparatus for continuously testing insulated wire to detect and record breaks in the insulation thereon so that the number of breaks per unit will actually be known.

Various devices have been utilized in the past for continuously testing the insulation on wire, generally immediately after the enamel has been applied. For example, the wire has been passed through a mercury bath, the mercury being connected to a source of voltage and the conductor of the wire grounded through the enameling machinery, as is the other side of the source of voltage. Thus, when a break in the insulation occurs, current flows through the conductor and the mercury, this current flow being sensed by conventional means to provide an indication and record of breaks in the insulation. While the mercury bath method provides satisfactory test results and has the advantage of requiring only a low voltage source, the mercury may be injurious to certain types of insulation.

Other types of testing devices have also been utilized in which current is caused to flow in response to the sensing by a contact device riding on the wire of a break in the insulation. However, while these devices have proved satisfactory for larger wire sizes, it has been found in the case of smaller wire sizes, that the arc which may form at the break in the insulation may burn the wire in two; this then requires restringing the enameling machine which is an expensive and time consuming operation. Devices which have been proposed in the past for continuously testing insulated wire and which would eliminate this difficulty have been complex, expensive, and not sufficiently reliable; magnet wire enameling machines may operate continuously for more than a year at a time and thus the testing apparatus must also operate continuously for the same period.

It is therefore desirable to provide a device for continuously testing the insulation on wire to detect and record breaks therein which will provide an adequate signal to actuate the indicating and recording apparatus and yet not draw currents sufficient to damage the wire or in any other way be injurious to the wire or its insulation. Such a device must therefore provide amplification of the signal indicating the break, and must at the same time be shock-resistant and provide completely reliable results without maintenance for long periods of time. The device must also be simple and relatively inexpensive since large numbers of insulation testing devices are used in a magnet wire mill.

Magnetic amplifiers have the ability to amplify relatively small signals, are simple, and provide completely reliable, maintenance-free operation. A testing device of the type here under consideration which utilizes a magnetic amplifier to energize the indicating and recording apparatus in response to an insulation break-sensing signal is described in application Serial No. 625,064 of M. L. Miller, filed November 29, 1956, and assigned to the assignee of the present application. In that application, contact means were provided arranged continuously to contact the wire for sensing a break in the insulation. A magnetic amplifier was provided having an alternating current input circuit, a signal circuit, and an output circuit, and a source of voltage was connected in circuit between the contact means and the signal circuit of a magnetic amplifier. Circuit connections were provided for connecting the signal circuit to the conductor of the wire so that the source of voltage caused current to flow through the signal circuit when a break in the insulation occurs adjacent the contact means. The magnetic amplifier was arranged to provide a change in its output voltage in response to the current flow in the signal circuit and indicating means were provided connected to the output of the magnetic amplifier and arranged to provide a positive indication in response to the change in output voltage thereby to indicate a break in the wire insulation.

It has been found that in devices of the type described in the aforesaid application Serial No. 625,064, certain stray currents tend to leak off of the lead wire to the contact means and return to ground, these currents being due to such things as corona, surface leakage of the insulators, and the admittance of free space. Since the signal circuit is connected back to the conductor of the wire, generally through ground, these leakage currents return to ground through the signal circuit and thus tend to provide false indications on the indicating and recording apparatus. If the insulation testing device is arranged to test wire using a single testing voltage level, it is possible to bias out these leakage currents in order to provide accurate readings. However, it is frequently desirable to test different wire diameters and different thicknesses of insulation at different voltage levels; under these conditions the leakage is not constant and therefore cannot be counteracted with a constant bias.

It is therefore desirable to provide a device of the magnetic amplifier type for continuously testing the insulation on wire in which stray leakage currents are by-passed around the signal circuit so that they do not provide false indications of insulation breaks.

In addition to the foregoing, the device disclosed in the aforesaid application Serial No. 625,064, utilizes a magnetic amplifier having an alternating current output with separate bias, signal, and gate windings. Since these testing devices may be used in large quantity in magnetic wire mills, it is desirable that they represent the utmost in simplicity and it is therefore further desirable to provide a device of the magnetic amplifier type for continuously testing the insulation on wire characterized by its simplicity and utilization of the minimum number of windings on the magnetic amplifier core.

It is accordingly an object of this invention to provide an improved device for continuously testing insulated wire to detect breaks in the continuity of the insulation thereon.

Another object of this invention is to provide a device incorporating a magnetic amplifier for continuously testing the continuity of insulation on wire, in which stray leakage currents are bypassed around the signal circuit of the magnetic amplifier.

Yet another object of this invention is to provide an improved device of the magnetic amplifier type for continuously testing the continuity of the insulation on wire characterized by its simplicity and minimum number of windings on the core of the magnetic amplifier.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broader aspects provides a device for continuously testing insulated wire to detect breaks in the continuity of insulation thereon having contact means arranged continuously to contact the wire for sensing a break in the insulation. A magnetic amplifier is provided having an alternating current input circuit, a signal circuit, and an output circuit. A source of voltage is provided and an electrical lead connects the contact means in circuit with the source of voltage. The signal circuit of the magnetic amplifier is in turn, connected in circuit with the source of voltage and circuit connections are provided for connecting the signal circuit to the conductor of the wire so that the source of voltage causes current to flow in the signal circuit when there is a break in the insulation on the wire adjacent the contact means. The magnetic amplifier is arranged to provide a change in its output voltage in response to the current flow in the signal circuit and indicating means are provided connected to the output circuit and arranged to provide a positive indication in response to the change in output voltage thereby to indicate a break in the wire insulation. The electrical lead connected to the contact means is provided with shielding means connected in circuit with the source of voltage so that stray leakage currents circulate in the circuit comprising the source of voltage, the lead and the shielding means and are thus bypassed from the signal circuit.

In accordance with the preferred embodiment of this invention, a half wave direct current output magnetic amplifier is employed utilizing a single winding which serves as a gate winding, signal winding, and bias winding, thus providing a much simpler device than previous devices of this type.

The single figure of the drawing is a schematic diagram illustrating the preferred embodiment of the improved wire insulation testing device of this invention.

Referring now to the drawing, the improved insulation testing device 1 of this invention includes a wire contacting device 2, preferably a wheel riding on the insulated wire 3 and preferably formed of semi-conducting material such as neoprene or carbon. The conductor of insulated wire 3 is grounded through the insulating and winding apparatus (not shown). A pair of alternating current input terminals 4 and 5 are provided adapted to be connected to an external source of single phase alternating current power (not shown) and a transformer 6 is provided having its primary winding 7 connected across input terminals 4 and 5. Transformer 6 has a high voltage secondary winding 8 which has one end 9 connected to contact wheel 2 by lead 10 through a series current limiting resistor 11. Lead 10 is provided with a shield 12, the shield 12 being connected to the other end 13 of secondary winding 8 by lead 14. As much of lead 10 as possible should be shielded, i. e., from immediately adjacent contact wheel 2 to immediately adjacent resistor 11. A pair of resistors 15 and 16 respectively have one end connected to lead 10 and have their other ends respectively connected to contacts 17 and 18 of switch 19. Switch 19 may also be provided with a blank contact 20 and has its movable member 21 connected to lead 14.

It will readily be seen that the resistors 15 and 16 together with resistor 11 constitute two voltage dividing networks and in conjunction with switch 19 provide for selectively applying different voltages to the contact wheel 2, the full voltage of secondary winding 8 of transformer 6 being applied when movable element 21 of switch 19 is moved to the blank position 20.

In order to actuate suitable indicating and recording apparatus in response to a break in the insulation on the wire 3, a magnetic amplifier 22 is provided having a core 23 formed of suitable magnetic material with windings 24 and 25 arranged thereon. A half wave rectifier 26 is serially connected between end 27 of winding 24 and end 28 of winding 25, the other end 29 of winding 24 being connected to input terminal 4 and the other end 30 of winding 25 being connected to output terminal 31. The other input terminal 5 is directly connected to the other output terminal 32 by lead 46 and it will thus be seen that winding 24 acts as a gate winding and that a half-wave rectified direct current voltage appears across the output terminals 31 and 32. The half wave rectifier current passed by rectifier 26 flows through winding 25 which therefore acts as a positive feedback winding.

A pair of serially connected resistors 33 and 34 are connected between lead 14 and end 27 of winding 24 and the other end 29 of winding 24 is connected to ground as at 35. A capacitor 36 is connected between the ground connection 35 and point 37 intermediate resistors 33 and 34.

It will now be seen that the high voltage provided by secondary winding 8 of transformer 6 is applied to semi-conducting contact wheel 2 which in turn establishes an ionized space around the portion of insulated wire 3 adjacent wheel 2. Wire 3 may be assumed to be moving in the direction shown by the arrow 48 from the enameling apparatus (not shown) to the spooling apparatus (also not shown) and if a break in the insulation coating on the conductor passes adjacent the contact wheel 2, a small current will flow through the ionized space, lead 10, current limiting resistor 11, secondary winding 8, lead 13, series resistors 33 and 34, winding 24, ground 35 and then back to the conductor wire 3 by virtue of its grounded connection. Current limiting resistor 11 and resistors 33 and 34 tend to limit this current to a safe value to prevent the arc formed in the ionized space by virtue of the break in the insulation from burning the wire in two or increasing the size of the discontinuity in the insulation. It is thus seen that winding 24, in addition to acting as the gate winding of the magnetic amplifier, also acts as the signal winding. In order to provide the requisite direct current resetting bias for the magnetic amplifier 22, another half wave rectifier 38 is provided connected between input terminal 5 and tap 39 on winding 24, variable resistor 40 being serially connected with rectifier 38 to adjust the bias level. It is thus seen that the portion 41 of winding 24 intermediate tap 39 and end 29 constitutes a direct current bias winding part of the winding. It will now be further seen that the signal winding 24 functions not only as the gate winding and signal winding, but also as the bias winding of the magnetic amplifier.

Output terminals 31 and 32 are connected to operating coil 42 of recorder 43 which provides a continuous indication on tape 44 of breaks in the insulation on wire 3. A third half wave rectifier 45 is connected between lead 46 and end 28 of feedback winding 25, this rectifier serving to allow inductive current to flow in the coil 42 of recorder 43 when rectifier 26 is not conducting. Resistors 33 and 34 together with capacitor 36 constitute an R–C filter circuit to prevent undesired voltage transients which may arise in the high voltage signal circuit from affecting the output of the magnetic amplifier.

It will be seen that magnetic amplifier 22 provides a half wave rectified direct current voltage output across output terminals 31 and 32 with current flowing every other half cycle (gating half cycle) from input terminal 4 through winding 24, half wave rectifier 26, feedback winding 25, output terminal 31 and coil 42 and back to input terminal 5 through lead 46. The bias current provided by rectifier 38 resets the bias or flux density level of the core during the intervening half cycles (resetting half cycles) so that the half wave rectified load current is insufficient to saturate the core 23 when there is no break in the insulation (and thus minimum signal current flow) and thus winding 24 has high reactance so that minimum load current flows. As is indicated previously, when a break in the insulation on wire 3 occurs adjacent the wheel 2, current flows from the conductor of wire 3 to wheel 2, lead 10, current limiting resistor 11, secondary winding 8, resistors 33 and 34, winding 24 and ground 35 which completes the circuit since, as indicated previously, the conductor of wire 3 is also grounded. This signal current opposes the effect of the bias current thereby permitting the load current passed by rectifier 26 to saturate the core 23 so that winding 24 has its reactance sufficiently lowered to permit a greatly increased flow of current through the load, which in this case is the coil 42 of recorder 43. This increased flow of load current sufficiently energizes coil 42 to actuate recorder 43 thereby to provide on tape 44 an indication of the break in the insulation of wire 3.

It will now be readily seen that any stray currents which tend to leak to ground from lead 10, by virtue of corona, surface leakage, or leakage to free space, are instead conducted to shield 12 and thus back to secondary 8 of transformer 6, these currents circulating in this circuit and therefore bypassing the signal circuit, i. e., resistors 33 and 34 and winding 24 so that they do not provide false indication on recorder 43.

While positive feedback winding 25 has been found to be desirable, since it improves the amplification and can by suitable adjustment provide snap action, it is not essential to operation of the device and may be eliminated by connecting rectifier 26 directly to output terminal 31 as shown by dotted line 47. Obviously, a capacitor may be substituted for the rectifier 45 to smooth out the direct current voltage on coil 42 and to allow inductive current to flow in the coil during the half cycles when rectifier 26 is non-conducting.

While the above device has been described in particular connection with the detection of breaks in the enamel insulation coating on magnetic wire, it will be readily apparent that it is equally applicable to other types of insulated wire, for example, rubber covered wire. Furthermore, while the contact device 2 has been shown as a wheel, it is readily apparent that other types of contact devices, such as a contact shoe, may be utilized. In addition, while a contact device 2 formed of semi-conducting material, is preferred for use with a small diameter wire, it is readily apparent that one or more contact devices formed of conductive material may be used. If this device is utilized for detecting breaks in the insulation of any individual wire forming a cable, such means as a salt bath may be substituted for the contact device 2 riding on the single wire 3.

While the single winding half-wave magnetic amplifier 22 is preferred, it will be readily apparent that other types of magnetic amplifiers may be used. Such arrangements presumably would not possess the desirable simplicity of the magnetic amplifier 22, but would nevertheless still eliminate the problem of error-causing space currents by virtue of the shield 12 surrounding lead 10.

A device incorporating the circuit described above has been constructed and used for testing magnetic wire having conductors from .0080 inch to .1285 inch in diameter and insulation coatings from .00025 inch to .0030 inch in thickness. A neoprene wheel was used as the conductive device 2 with secondary winding 8 of transformer 6 having a 3000 volt open circuit voltage output, terminals 4 and 5 being connected across a source of 115 volts, 60 cycle alternating current. Current flowing in the signal circuit in response to a break in insulation on wire 3 was on the order of 0.2 milliampere while the output voltage provided across output terminals 31 and 32 was 36 volts with signal current flowing, in contrast with 2.5 volts with no break-indicating signal current flowing. Core 23, magnetic amplifier 22 was toroidal in configuration having an outside diameter of 1.50 inches, an inside diameter of 1.00 inch, and a height of .375 inch. Winding 24 comprised 6500 turns of .005 inch diameter wire with bias portion 41 having 650 turns. Feedback winding 25 had 100 turns of .005 wire and the bias current provided by rectifier 38 was found to be 2.0 milliamperes. Rectifiers 26, 38 and 45 were of the germanium type, however, it is readily apparent that any other type of rectifier including tube rectifiers may be used.

It will now be readily apparent that this invention provides a device which is greatly simplified over previous devices which utilizes a half-wave, single winding magnetic amplifier and which bypasses stray leakage currents so that they do not adversely affect the accuracy of the device.

While we have shown and described a specific embodiment of this invention, further modifications and improvements will occur to those skilled in the art. We desire that it be understood therefore that this invention is not limited to the specific form shown and we intend in the appended claims to cover all modifications which do not depart from the spirit and scope of this invention.

What we claim as new and desire to secure by Letters Patent of the United States is:

1. A device for continuously testing insulated wire to detect breaks in the continuity of the insulation thereon, said device comprising contact means adapted continuously to contact said wire for sensing a break in said insulation; a magnetic amplifier having an alternating current input circuit, a signal circuit, and an output circuit; a source of voltage, an electrical lead connecting said contact means in circuit with said source of voltage, said signal circuit being connected in circuit with said soure of voltage, circuit connections for connecting said signal circuit to the conductor of said wire whereby said voltage source causes current to flow in said signal circuit when a break in said insulation is adjacent said contact means, said magnetic amplifier being arranged to provide a change in output voltage in response to said current flow in said signal circuit, and indicating means connected to said output circuit and arranged to provide a positive indication in response to said change in output voltage thereby to indicate a break in said wire insulation, said electrical lead having shielding means connected in circuit with said source of voltage for bypassing leakage currents around said signal circuit.

2. A device for continuously testing insulated wire to detect breaks in the continuity of the insulation thereon, said device comprising contact means adapted continuously to contact said wire for sensing a break in said insulation; a magnetic amplifier having an alternating current input circuit, a signal circuit, and an output circuit; a source of voltage, means connected in circuit with said source of voltage for obtaining a selective variable output voltage, an electrical lead connecting said contact means to said means for obtaining a selectively variable voltage, said signal circuit being connected in circuit with said source of voltage, circuit connections for connecting said signal circuit to the conductor of said wire whereby said voltage source causes current to flow in said signal circuit when a break in said insulation is adjacent said contact means, said magnetic amplifier being arranged to provide a change in output voltage in response to said current flow in said signal circuit, and indicating means connected to said output circuit and arranged to provide a position indication in response to said change in output voltage thereby to indicate a break in said wire insulation, said electrical lead having shielding means connected in circuit with said source of voltage for bypassing leakage currents around said signal circuit.

3. A device for continuously testing insulated wire to detect breaks in the continuity of the insulation thereon, said device comprising contact means adapted continuously to contact said wire for sensing a break in said insulation, a pair of alternating current input terminals; a magnetic amplifier having an alternating current input circuit connected for energization from said input terminals, a signal circuit, and an output circuit; a transformer having a primary winding connected across said input terminals and having a high voltage secondary winding, an electrical lead serially connecting said contact means to one side of said secondary winding, said signal circuit being serially connected to the other side of said secondary winding, circuit connections for serially connecting said signal circuit to the conductor of said wire whereby current flows in said signal circuit when a break in said insulation is adjacent said contact means, said magnetic amplifier being arranged to provide a change in output voltage in response to said current flow in said signal circuit, and indicating means connected to said output circuit and arranged to provide a positive indication in response to said change in output voltage thereby to indicate a break in wire insulation, said electrical lead having shielding means connected to said other side of said secondary winding for bypassing leakage currents around said signal circuit.

4. A device for continuously testing insulated wire to detect breaks in the continuity of the insulation thereon, said device comprising contact means adapted continuously to contact said wire for sensing a break in said insulation, a pair of alternating current input terminals; a magnetic amplifier having an alternating current input circuit connected for energization from said input terminals, a signal circuit, and an output circuit; a transformer having a primary winding connected across said input terminals and having a high voltage secondary winding, an electrical lead connected to said contact means, first impedance means serially connecting said lead to one side of said secondary winding, at least one additional impedance means having one end connected to said lead, means for selectively connecting the other end of said additional impedance means to the other side of said secondary winding thereby to impress a selectively variable voltage on said contact means, said signal circuit being serially connected to said other side of said secondary winding, circuit connections for serially connecting said signal circuit to the conductor of said wire whereby current flows in said signal circuit when a break in said insulation is adjacent said contact means, said magnetic amplifier being arranged to provide a change in output voltage in response to said current flow in said signal circuit, and indicating means connected to said output circuit and arranged to provide a positive indication in response to said change in output voltage thereby to indicate a break in said insulation, said electrical lead having shielding means connected to said other side of said secondary winding for bypassing leakage currents around said signal circuit.

5. A device for continuously testing insulated wire to detect breaks in the continuity of the insulation thereon, said device comprising contact means adapted continuously to contact said wire for sensing a break in said insulation, a pair of alternating current input terminals and a pair of direct current output terminals; a magnetic amplifier having a core formed of magnetic material with winding means arranged thereon, at least a part of said winding means being connected in circuit with said input terminals thereby forming a gate winding, half wave rectifying means connecting said winding part in circuit with said output terminals thereby providing a half wave rectified direct current output voltage across said output terminals, a source of voltage, an electrical lead serially connecting said contact means to one side of said source of voltage, at least a part of said winding means being serially connected to the other side of said source of voltage thereby forming a signal circuit, circuit connections for serially connecting said last-named winding part to the conductor of said wire whereby said voltage causes current to flow in said last named winding part when a break in said insulation is adjacent said contact means, second half wave rectifying means connecting one of said input terminals to a part of said winding means thereby providing a direct current bias winding, said last named winding part and said second half wave rectifying means being arranged to provide a change in said output voltage in response to said current flow, and indicating means connected to said output terminals to provide a positive indication in response to said change in output voltage thereby to indicate a break in said wire insulation, said electrical lead having shielding means connected to said other side of said source of voltage for bypassing leakage current around said signal circuit.

6. A device for continuously testing insulated wire to detect breaks in the continuity of the insulation thereon, said device comprising contact means adapted continuously to contact said wire for sensing a break in said insulation, a pair of alternating current input terminals and a pair of output terminals; a magnetic amplifier having a core formed of magnetic material with a winding arranged thereon, said winding being connected in series with first half wave rectifying means between one of said input terminals and one of said output terminals thereby forming a gate winding circuit, the other of said input terminals being connected to the other of said output terminals thereby providing a half wave rectified direct current output voltage across said output terminals, a transformer having a primary winding connected across said input terminals and having a high voltage secondary winding, an electrical lead serially connecting said contact means to one side of said secondary winding, said magnetic amplifier winding being serially connected to the other side of said secondary winding thereby forming a signal circuit, circuit connections for serially connecting said magnetic amplifier winding to the conductor of said wire whereby current flows in said magnetic amplifier winding when a break in said insulation is adjacent said contact means, second half wave rectifying means connecting said other input terminal and a tap on said magnetic amplifier winding thereby providing a direct current bias winding from a part of said winding, said direct current biasing winding part and said second half wave rectified means being arranged to provide an increase in said output voltage response to said current flow, and indicating means connected to said output terminals and arranged to provide a positive indication in response to said increase in output voltage thereby to indicate a break in said wire insulation, said electrical lead having shielding means adjacent said contact means and connected to said other side of said secondary winding for bypassing leakage currents from said signal circuit.

7. A device for continuously testing insulated wire to detect breaks in the continuity of the insulation thereon, said device comprising contact means adapted continuously to contact said wire for sensing a break in said insulation, a pair of alternating current input terminals and a pair of direct current output terminals; a magnetic amplifier having a core formed of magnetic material with first and second windings arranged thereon, said first and second windings being serially connected with a half wave rectifier between one of said input terminals and one of said output terminals whereby said first winding forms a gate winding and said second winding forms a feed-back winding, the other of said input terminals being connected to the other of said output terminals thereby providing a half wave rectified direct current output voltage across said output terminals, a transformer having a primary winding connected across said input terminals and having a high voltage secondary winding, an electrical lead serially connecting said contact means to one side of said secondary winding, the other side of said secondary winding being serially connected to one end of said first magnetic amplifier winding thereby forming a signal circuit, circuit connections for serially connecting the other end of said first magnetic amplifier winding to the conductor of said wire whereby current flows in said first winding when a break in said insulation is adjacent said contact means, a second half wave rectifier connecting said other output terminal and a tap on said first magnetic amplifier winding thereby providing a direct current bias winding from a part of said first magnetic amplifier winding, said direct current bias winding part and said second half wave rectifier being arranged to provide an increase in said output voltage in response to said current flow, indicating means connecting to said input terminals to provide a positive indication in response to said increase in said output voltage thereby to indicate a break in said wire insulation, and a third half wave rectifier connected between said other input and output terminals and one end of said second magnetic amplifier winding for providing inductive current for said indicating means when said first rectifier is not conducting, said electric lead having shielding means adjacent said contact means and connected to said other side of said secondary winding for bypassing leakage currents from said signal circuit.

8. A device for continuously testing insulated wire to detect breaks in the continuity of the insulation thereon, said device comprising contact means adapted continuously to contact said wire for sensing a break in said insulation, a pair of alternating current input terminals and a pair of direct current output terminals; a magnetic amplifier having a core formed of magnetic material with first and second windings arranged thereon, a half wave rectifier serially connected between one end of each of said windings, the other end of said first winding being connected to one of said input terminals and the other end of said second winding being connected to one of said output terminals whereby said first winding forms a gate winding and said second winding forms a feedback winding, the other of said input terminals being connected to the other of said output terminals thereby providing a half wave rectified direct current output voltage across said output terminals, a transformer having a primary winding connected across said input terminals and having a high voltage secondary winding, an electrical lead connected to said contact means, first impedance means serially connecting said lead to one side of said secondary winding, at least one additional impedance means having one end connected to said lead, switching means for selectively connecting the other end of said additional impedance means to the other side of said secondary winding thereby to impress a selectively variable voltage on said contact means, a pair of serially connected resistors connecting said one end of said first magnetic amplifier winding to said other side of said secondary winding thereby forming a signal circuit, a capacitor connected between the midpoint between said resistors and said other side of said first magnetic amplifier winding and forming a filter circuit with said resistors, circuit connections for serially connecting said other end of said first magnetic amplifier winding to the conductor of said wire whereby current flows in said first magnetic amplifier winding when a break in said insulation is adjacent said contact means, a second half wave rectifier connecting said other output terminal and a tap on said first magnetic amplifier winding thereby providing a direct current bias winding part, said second half wave rectifier and said bias winding part being arranged to provide an increase in said output voltage in response to said current flow, indicating means connected to said input terminals and arranged to provide a positive indication in response to said increase in said output voltage thereby indicating a break in said wire insulation, and a third half wave rectifier connected between said other input and output terminals and said one end of said second winding for providing inductive current for said indicating means when said first rectifier is not conducting, said electric lead having shielding means adjacent said contact means and connected to said other side of said secondary winding for bypassing leakage currents from said signal circuit.

References Cited in the file of this patent
UNITED STATES PATENTS

| | | |
|---|---|---|
| 2,304,513 | Stearns | Dec. 8, 1942 |
| 2,568,172 | Spencer | Sept. 18, 1951 |
| 2,700,125 | King et al. | Jan. 18, 1955 |
| 2,719,288 | Young | Sept. 27, 1955 |
| 2,798,170 | Carlisle | July 2, 1957 |